3,036,104
STABILIZATION OF COPPER CHELATE
Charles Parkes Matzinger, Berkeley, Calif., assignor to The Mountain Copper Company, Ltd., a corporation of Great Britain
No Drawing. Filed July 29, 1959, Ser. No. 830,182
6 Claims. (Cl. 260—438)

This invention relates in general to chelates and more particularly to a method for stabilizing copper ethylene diamine tetraacetate.

The chelate copper ethylene diamine tetraacetate which is generally prepared from the alkali metal salt of ethylene diamine tetra-acetic acid finds a number of uses. For example, it is mentioned in Bersworth Patent 2,544,649 as a stabilizer. The maintenance of a stable chelate solution is desirable when so used and in various other environments also.

Upon standing for a period of time or being heated, copper ethylene diamine tetraacetate tends to deteriorate to the extent that cuprous oxide forms by the reduction of the copper to the monovalent state, whereat it is no longer chelatable. The copper so reduced cannot be re-sequestered by the addition of more of the chelating agent, the alkali metal salt of ethylene diamine tetra-acetic acid. This situation can only be corrected by the addition of a material which will lessen the reducing activity of the system.

It is therefore an object of this invention to provide a method for reducing the activity of a system incorporating the copper salt of ethylene diamine tetra-acetic acid.

It is a further object of this invention to provide a stable solution containing copper ethylene diamine tetraacetate wherein the copper has a lessened tendency to be reduced to the monovalent state.

Generally, it has been found that the addition of small amounts of ethylene diamine to a solution containing the ethylene diamine tetra-acetic acid (EDTA) chelate of copper is capable of maintaining the copper in a completely chelated state (sequestered) over extended periods of time such that the shelf-life of any product containing the chelate is greatly improved. The product may be held at relatively high temperatures while continuing to exhibit unusual stability, manifested by the fact that a residue of cuprous oxide which would indicate the destruction of the copper chelate does not form.

More particularly, it has been found that between about 1% and 5% ethylene diamine based on the weight of the chelate, is capable of stabilizing a solution thereof for periods of one year or longer. Deterioration may take place in such copper chelates within two months after manufacture where no stabilizer is added. The preferred amount of ethylene diamine is 0.4% by weight based upon the weight of a standard solution containing 21% chelate, or 2% based on the weight of the chelate alone.

To test the stabilizing characteristics of ethylene diamine in the copper chelate solution and to provide a basis for comparison, two samples of an aqueous solution of the copper salt of EDTA were prepared, each containing 21% copper chelate. A quantity of 0.4% ethylene diamine based on the weight of the aqueous solution was added to one of the moieties. Both samples were covered with cotton to prevent contamination from without while allowing free passage for vapors. The samples were placed in an oven to raise the temperature to 175° F. After two days at this temperature, the samples containing no ethylene diamine began to show visual indications of deterioration. The copper chelate broke down leaving a cuprous oxide residue which settled out of solution. The deterioration continued as time passed until a considerable quantity of residue was built up on the bottom of the container. By contrast, the sample containing the ethylene diamine showed no deterioration. No residue formed and the solution remained clear and blue, identical to the original solution. Evaporation with heating was continued for 5 days until both the samples became gel-like. The sample with the ethylene diamine remained clear while the sample lacking this material became opaque.

The quantities of ethylene diamine were varied and comparative tests conducted. Quantities of between about 0.2% and 1% based on the weight of the 21% copper chelate solution (dry weight 1%–5%) were found to be optimum though it is possible to use substantially greater quantities of ethylene diamine without adversely affecting the results, except insofar as the wastage of ethylene diamine is concerned. It is also possible to use less than that suggested since any small but perceptible amount has some stabilizing effect.

A convenient method for preparing the copper chelate solution is to react cupric hydroxide and the sodium salt of EDTA in water solution. As stated, such a solution has many uses, as in the clarification of water and the concentration of the solution may be varied significantly, depending on the use for which the solution is destined.

Obviously many modifications and variations of this invention may be made without departing from the spirit and scope thereof and only such limitations should be imposed as are indicated in the appended claims.

I claim:
1. A stabilized aqueous solution containing the ethylene diamine tetra-acetic acid chelate of copper and having therein as a stabilizer therefore, a small but perceptible amount of ethylene diamine.
2. The product of claim 1 wherein between about 1% and 5% of said stabilizer, based upon the weight of said chelate, is present in the said solution.
3. A process for preparing a stabilized solution of a copper chelate comprising: reacting an alkali metal salt of ethylene diamine tetra-acetic acid with copper hydroxide in water solution to form a solution of the ethylene diamine tetra-acetic acid chelate of copper; and adding thereto, as a stabilizer therefor, a small but perceptible amount of ethylene diamine.
4. The process of claim 3 wherein the ethylene diamine is added in a quantity of between about 1% and 5% based upon the weight of the said chelate solution.
5. A process for forming a stabilized ethylene diamine tetra-acetic acid chelate of a copper comprising: forming an aqueous solution of the said chelate and adding thereto a small but perceptible amount of ethylene diamine as a stabilizer therefor.
6. The process of claim 5 wherein the ethylene diamine is added in the quantity of between about 1% and 5% based upon the weight of the said chelate in the acid solution.

References Cited in the file of this patent
UNITED STATES PATENTS
2,203,374    Van Melsen _____ June 4, 1940
2,974,156    Sobatzki _____ Mar. 7, 1961